United States Patent [19]
Fraser et al.

[11] Patent Number: 5,995,947
[45] Date of Patent: Nov. 30, 1999

[54] INTERACTIVE MORTGAGE AND LOAN INFORMATION AND REAL-TIME TRADING SYSTEM

[75] Inventors: Stephen K. Fraser, Livermore; Sadashiv Adiga, Hercules; Suresh Payankannur, Richmond, all of Calif.

[73] Assignee: IMX Mortgage Exchange, San Ramon, Calif.

[21] Appl. No.: 08/928,559

[22] Filed: Sep. 12, 1997

[51] Int. Cl.$^6$ .................................................. G06F 17/00
[52] U.S. Cl. .............................. 705/38; 705/35; 705/37; 395/233
[58] Field of Search ................................. 705/38, 35, 37; 395/200.33, 200.47, 200.57, 200.61, 200.49

[56] References Cited

U.S. PATENT DOCUMENTS

| | | |
|---|---|---|
| 4,750,119 | 6/1988 | Cohen et al. . |
| 4,799,156 | 1/1989 | Shavit et al. . |
| 4,876,648 | 10/1989 | Lloyd . |
| 5,136,501 | 8/1992 | Silverman et al. . |
| 5,297,031 | 3/1994 | Gutterman et al. . |
| 5,375,055 | 12/1994 | Togher et al. . |
| 5,500,793 | 3/1996 | Deming et al. . |
| 5,508,913 | 4/1996 | Yamamoto et al. . |
| 5,560,005 | 9/1996 | Hoover et al. . |
| 5,584,025 | 12/1996 | Keithley et al. . |
| 5,592,375 | 1/1997 | Salmon et al. . |
| 5,611,052 | 3/1997 | Dykstra et al. ........................... 705/38 |

OTHER PUBLICATIONS

XP002090668 Harker P.T. et al Aug. 1996.
XP002090669 Meyer D.L. et al Apr. 1992.
XP002090670 Colby M. Apr. 1993.
XP002090671 Reinbach A. Nov. 1996.

*Primary Examiner*—Thomas R. Peeso
*Attorney, Agent, or Firm*—Swernofsky Law Group

[57] ABSTRACT

The invention provides a method and system for trading loans in real time by making loan applications, such as home mortgage loan applications, and placing them up for bid by a plurality of potential lenders. A transaction server maintains a database of pending loan applications and their statuses; each party to the loan can search and modify that database consistent with their role in the transaction, by requests to the server from a client device identified with their role. Brokers at a broker station can add loan applications, can review the status of loan applications entered by that broker, are notified of lender's bids on their loans, and can accept bids by lenders. Lenders at a lender station can search the database for particular desired types of loans, can sort selected loans by particular desired criteria, can bid on loan applications, and are notified when their bids are accepted. Broker stations, lender stations, and the transaction server can be coupled using multiple access methods, including internet, intranet, or dial-up or leased communication lines.

38 Claims, 2 Drawing Sheets

FIG. 1

FIG. 2 ance of lending rates), and disseminated using paper "rate sheets" or similar advertising material. For example, a mortgage broker attempting to obtain a loan for a borrower might be required to interview that client, consult rate sheets from multiple lenders to determine appropriate lending programs which might be appropriate for that client, submit multiple applications (possibly on multiple different forms) to selected ones of those lenders, and await action on those applications before being able to advise that client. Similarly, a lender attempting to set lending rates might be required to examine the present interest rate market, determine the mix of qualified borrowers likely to apply, determine a set of lending programs and lending rates best suited to the market and the risk the lender is willing to bear, and periodically post rate sheets or similar advertising material to multiple mortgage brokers informing them of those lending programs and lending rates. Upon receiving a loan application, the lender might also be required to independently evaluate the creditworthiness of the borrower and the value of the underlying property.

INTERACTIVE MORTGAGE AND LOAN INFORMATION AND REAL-TIME TRADING SYSTEM

BACKGROUND OF THE INVENTION

1. Field of the Invention

The invention relates to an interactive mortgage and loan information and real-time trading system.

2. Related Art

In the art of mortgage loans and mortgage brokering, a relatively large amount of information must be exchanged to conduct a loan transaction, such as a new home mortgage loan. In attempting to obtain a competitive loan for the borrower, or in attempting to maintain competitive rates for lenders to offer loans, this relatively large amount of information must be collected, compared, evaluated, and disseminated to possible counterparties to the transaction. The major parties include the borrower (and/or an agent such as a mortgage broker) and the lender; other parties can include appraisal agents, regulatory agencies, mortgage insurance companies, and secondary mortgage market participants.

In known practices, nearly all the information relating to a loan transaction is collected by hand, transmitted using paper applications, compared by human beings (whose responsibilities include loan evaluation, property appraisal, financial market evaluation, and setting of lending rates), and disseminated using paper "rate sheets" or similar advertising material. For example, a mortgage broker attempting to obtain a loan for a borrower might be required to interview that client, consult rate sheets from multiple lenders to determine appropriate lending programs which might be appropriate for that client, submit multiple applications (possibly on multiple different forms) to selected ones of those lenders, and await action on those applications before being able to advise that client. Similarly, a lender attempting to set lending rates might be required to examine the present interest rate market, determine the mix of qualified borrowers likely to apply, determine a set of lending programs and lending rates best suited to the market and the risk the lender is willing to bear, and periodically post rate sheets or similar advertising material to multiple mortgage brokers informing them of those lending programs and lending rates. Upon receiving a loan application, the lender might also be required to independently evaluate the creditworthiness of the borrower and the value of the underlying property.

As all of these operations are presently performed by hand, initiating loan transactions is relatively expensive. Although some forms of automation are known, such as uniform credit scoring for loan applications and automatic generation of loan application documents, there are no known systems in the field of mortgage lending for providing relatively automatic and widespread dissemination of loan application information or lending program information for automated comparison in real time. The fact that these operations are performed by hand, rather than with the aid of computer processing, also limits the flexibility of the parties to the transaction. For borrowers, it is relatively difficult to compare more than a relatively few lending programs. For lenders, it is relatively difficult to select anything but a relatively simple set of lending categories for prospective borrowers. It is also practically impossible for lenders to experiment with new products without broadcasting knowledge of those new products to a wide population, including their competitors.

Accordingly, it would be advantageous to provide a method and system for automating loan applications, such as home mortgage loan applications, placing them up for bid by a plurality of potential lenders, and following those loans using a technique for managing such loan applications and bids. This advantage is achieved in an embodiment of the invention in which a database server maintains a database of pending loan applications and their statuses; each party to the loan can search and modify that database consistent with their role in the transaction, by requests to the server from a client device identified with their role.

SUMMARY OF INVENTION

The invention provides a method and system for trading loans in real time by making loan applications, such as home mortgage loan applications, and placing them up for bid by a plurality of potential lenders. A transaction server maintains a database of pending loan applications and their statuses; each party to the loan can search and modify that database consistent with their role in the transaction, by requests to the server from a client device identified with their role.

In a preferred embodiment, brokers at a broker station can add loan applications, can review the status of loan applications entered by that broker, are notified of lender's bids on their loans, and can accept bids by lenders. Lenders at a lender station can search the database for particular desired types of loans, can sort selected loans by particular desired criteria, can bid on loan applications, and are notified when their bids are accepted. Broker stations, lender stations, and the transaction server can be coupled using multiple access methods, including internet, intranet, or dial-up or leased communication lines.

The transaction server marks prospective loans in its database by a variety of identifiers which might be of interest to lenders, including a loan amount, property location, property appraisal, borrower credit information, and potential CRA qualification for the property. The transaction server computes information about prospective loans which might be of interest to lenders, such as loan-to-value ratios, qualifying credit scores, and income classification for potential CRA qualification of the loan. The transaction server provides exogenous information which might be of interest to lenders and brokers for pricing loans, such as public bond market and other interest rate market news, as well as computed information regarding the pool of loans, such as current and past low, average, and high rates for a variety of loans traded using the system.

In a preferred embodiment, the transaction server provides for detecting substantially identical loan applications originated by the same broker, so as to prevent double applications for the same borrower, and also provides brokers and lenders each the capability for designating counterparties with whom they wish not to conduct business. The transaction server is also supported by administration client/server devices for maintaining consistency and integrity of the transactions and relationships between parties.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using general purpose switching processors or special purpose switching processors or other circuits adapted to particular process steps and data structures described herein, and that implementation of the process steps and data structures described herein would not require undue experimentation or further invention.

System Architecture

Figure 1:
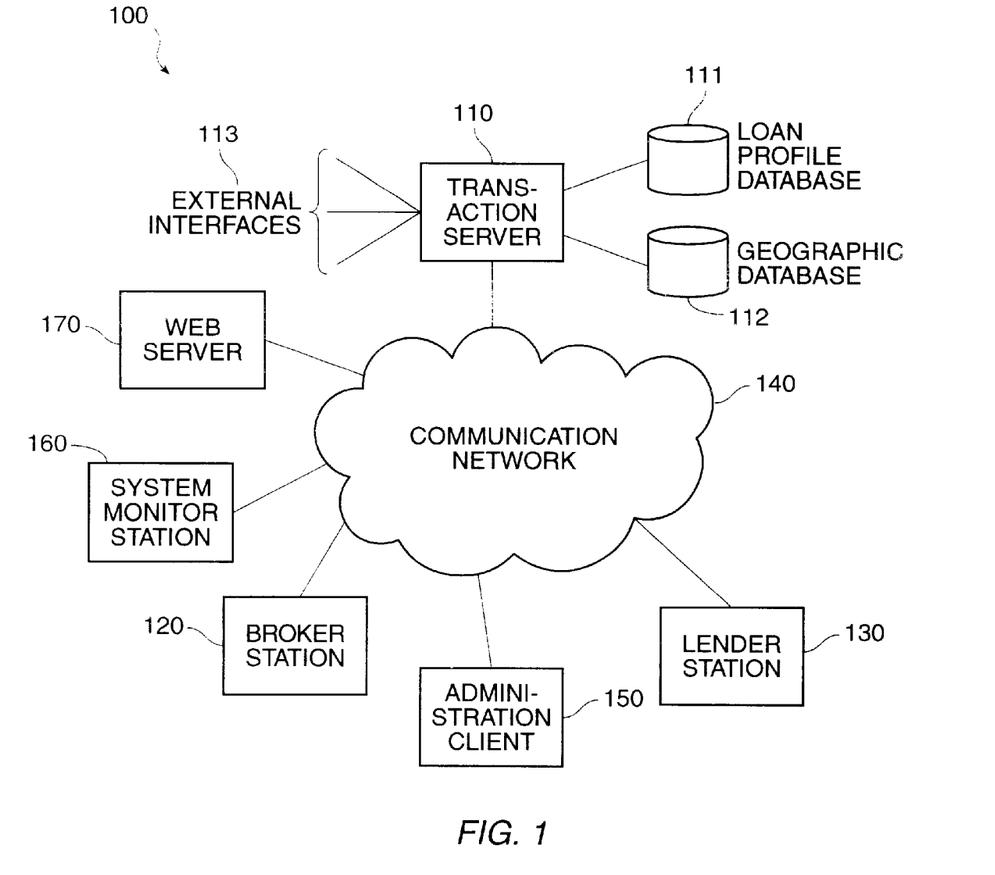
FIG. 1 shows a block diagram of an interactive mortgage and loan information and real-time trading system.

FIG. 1 shows a block diagram of an interactive mortgage and loan information and real-time trading system.

An interactive mortgage and loan information and trading system 100 includes a transaction server 110, a set of broker stations 120, a set of lender stations 130, an administration client 150, a set of system monitor stations 160, a web server 170, and a communication network 140.

(1) Transaction Server

The transaction server 110 comprises a device or set of devices coupled to the network 140, such as a general purpose processor operating under control of operating system and application software, and disposed to respond to messages from the broker stations 120, the lender stations 130, and the system monitor stations 160, as described herein. In a preferred embodiment, the transaction server 110 can comprise a Unix server such as a Sun UltraSparc processor operating under control of the Solaris operating system.

The transaction server 110 includes a trading system database 111, a geographic database 112, and a set of external interfaces 113. The transaction server 110 enters loan profiles into the trading system database 111 in response to requests from the broker stations 120, searches the trading system database 111 in response to requests from the lender stations 130, and modifies the trading system database 111 in response to changes in status for loan profiles stored therein.

The trading system database 111 includes loan profiles and other information needed to support trading operations for loans, stored in a relational database accessed using a database server module. In a preferred embodiment, the relational database comprises an Oracle database, but in alternative embodiments the relational database may comprise another type of relational database, such as a Sybase database, or may comprise an object-oriented database or another type of database structure.

The trading system database 111 includes information regarding each loan application and its status. Each loan application includes a loan profile, which comprises information about the prospective loan, a set of bids, each of which comprises an offer to make the loan from a particular lender, and a set of status information, which relates to the processing of the loan application using the system 100.

In a preferred embodiment, at least the following information is included for each loan profile:

information about the loan, including—loan category (FHLMC, FNMA, Conduit, VA, FHA, or Other); loan amount; loan type, such as adjustable or fixed interest rate; loan duration information about the underlying property, including—property type, such as SFR (single family residence), 2 units, 3 units, or 4 units; property location, by street address, city, county, and state; seller's asking price; appraised value information about the borrower, including—income and assets, credit history, and any negative information about the borrower (such as bankruptcy filings or debt discharge dates, reports of late mortgage payments)

The transaction server 110 computes some information for each loan application which might be of interest to lenders and enters that information in the trading system database 111 when the loan profile itself is entered.

In a preferred embodiment, this computed information includes:

computed information about the loan, including—LTV (loan to value), CLTV (combined loan to value); debt ratios (Front ratio and Back ratio)

computed information about the property, including its census tract, its MSA (Metropolitan Statistical Area); its qualification as being in an area with majority population belonging to ethnic minorities; the income classification for its MSA computed information about the borrower, including—combined income and combined debt for multiple borrowers; qualifying credit score; CRA qualification for the loan (responsive to the borrower's income, the median income for the property's census tract, and the median income for the property's MSA)

The geographic database 112 includes a geocoded database accessed using a geographic database module. In a preferred embodiment, the geocoded database relates each property address to its corresponding census tract, and comprises information relating to each census tract, such as median income, used for computing possible CRA qualification for the loan. The transaction server 110 reads the geographic database 112 to determine information relating to the property.

The external interfaces 113 include communication links to exogenous information and services, using the network 140 or other direct links. The transaction server 110 uses the external interfaces 113 to obtain information relating to the interest rate markets, the borrower, or the property.

In a preferred embodiment, these exogenous information and services include:

credit agencies and credit information provided by them desktop underwriting systems

MIDEX loan processing systems real estate appraisal systems mortgage insurance agencies and mortgage scores provided by them information sources for public market and other news, including—real time quotes for 10 year Treasury notes, 30 year Treasury bonds, DJIA (Dow Jones Industrial Average), and NSDQ (National Securities Dealers Quotes)

In a preferred embodiment, the transaction server 110 includes a set of program modules. Each module is a set of software objects and/or program elements, collectively having the ability to execute independently in a separate thread or logical chain of process execution. Each module can be executed as a separate logical server or using a separate physical device. However, for clients such as the broker stations 120, the lender stations 130, and the administrative stations 150, the transaction server 110 operates as a single logical server available using the network 140.

In a preferred embodiment, the transaction server 110 includes the following program modules:

login module—This module is responsible for password checking, access control, and assignment of a particular program module to service the client. Each broker station 120 is serviced by a broker module, each lender station 130 is serviced by a lender module, and each administration station 150 is serviced by an administration module.

In a preferred embodiment, the login module also implements a load management policy so as to distribute computing tasks among different server devices on the network 140. broker module—This module handles all server-side application requirements of the broker station 120.

lender module—This module handles all server-side application requirements of the lender station 130.

administration module—This module handles all server-side application requirements of the administration station 150.

external interface modules—Each interface to an external loan origination package or loan documentation package coupleable to the transaction server 110 has its own corresponding external interface module, for converting incoming data to a format for communication with the respective application module or database (most interfaces require only one way communication to receive data from an external package).

external service modules—Each external service has a module for communicating with that external service and for obtaining information in a format required by the external service. For example, one of the external service modules would be used to obtain credit scores and reports from credit reporting agencies (most external services require two way communication with an external agent or process).

notification module—This module handles notification and electronic mail communication with the broker stations 120 and the lender stations 130.

database interface module—This module handles all interface requirements between application modules and the databases. For example, the database interface module manages (a) the number of simultaneous connections to the database such that the total number is maintained within applicable license agreements; and (b) any integrity problems in interactions between application modules and the databases. Thus, this module allows the Transaction Server to be connected to different types of databases such as relational databases or object-oriented databases.

geoserver module—This module receives the address sent to the transaction server 110, performs a query to the geographic database for any matches, evaluates any matches and prepares a query response to the broker station 120.

monitoring module—This module manages resource usage by other modules and by the entire system.

system module—This module includes a collection of data objects and program elements for utility tasks such as printing, reporting, and audit trails.

trading system database 111—This database includes loan profile data from the broker stations 120, computed data for those loan profiles, and other relevant data needed to support real-time trading (such as user profiles and access permission information).

geographical database 112—This database includes data based on that published by the U.S. Census Bureau and the U.S. Postal Service ZIP +4 directory files.

In a preferred embodiment, the transaction server 110 can configure its program modules and change operating parameters dynamically while the system 100 is operating, by editing selected files having operating parameters used during operation of the system 100. Thus, additional devices can be added into the network 140 to meet resource requirements of the system 100.

(2) Broker Stations

Each of the broker stations 120 comprises a device or set of devices coupled to the network 140, such as a general purpose processor operating under control of operating system and application software, and disposed to enter and process loan profiles, as described herein. In a preferred embodiment, one of the broker stations 120 can comprise a PC workstation such as an Intel Pentium processor operating under control of the Microsoft Windows 95 operating system.

The broker station 120 operates under control of broker client software, which interacts using the network 140 with the transaction server 10 as described herein. The broker station 120 includes information input devices, such as a keyboard and mouse or other pointing device, and information output and presentation devices, such as a monitor and printer.

As used herein, the term "broker" includes any person or entity fulfilling a role as a loan originator, not necessarily a loan broker or a mortgage broker. For example, the broker stations 120 could be used directly by prospective borrowers, by cooperatives thereof, or by certain classes of loan officers at lending institutions.

A brokerage organization can use the broker station 120 so as to coordinate with the brokerage's organizational structure. For example, a loan processor or a manager can enter and view loans on behalf of one or more brokers, either individually or simultaneously in one screen display. Typically, a loan processor would act on behalf of a small number of selected brokers, while a manager would act on behalf of all brokers possibly including himself or herself.

A broker uses the broker station 120 to transmit loan profiles to the transaction server 110 (thus entering those loan profiles into the system 100 for processing), to review the status of those loan profiles as they are processed by the system 100, to receive notification of bids on those loan profiles by lenders, to review bids by lenders, to accept or decline bids by lenders, and to communicate with other users of the system 100.

In a preferred embodiment, the broker station 120 makes connections to the transaction server 110 using the network 140 on an as-needed basis, so as to send messages to the transaction server 110 without excessive use of the network 140. Thus, when the broker station 120 has a loan profile to transfer to the transaction server 110, the broker station 120 makes the connection to the transaction server 110 using the network 140 at that time, rather than maintaining a connection to the transaction server 110 while the broker is composing or editing the loan profile information.

The broker station 120 can also receive asynchronous communications from the transaction server 110, such as in the event there are urgent communications or other information of immediate interest to the broker. For example, the broker can request the transaction server 110 to transmit messages to the broker station 120 whenever any loan profile receives a bid having specified criteria (the broker can set these criteria, or can request notification of all bids or of none). The broker station 120 can also receive electronic mail messages from other users of the system 100, including other brokers, lenders, or other parties.

The transaction server 110 can also broadcast events of interest to all broker stations 120, lender stations 130, other parties, or selected ones thereof.

In a preferred embodiment, the broker station 120 includes a software interface to an existing loan package software element, so that brokers can use that existing loan package software element to prepare loan profiles and transmit those loan profiles to the transaction server 110.

(3) Lender Stations

Each of the lender stations 130 comprises a device or set of devices coupled to the network 140, such as a general purpose processor operating under control of operating system and application software, and disposed to process loan profiles, as described herein. In a preferred embodiment, one of the lender stations 130 can comprise a PC workstation such as an Intel Pentium processor operating under control of the Microsoft Windows 95 operating system.

The lender station 130 operates under control of lender client software, which interacts using the network 140 with the transaction server 110 as described herein. The lender station 130 includes information input devices, such as a keyboard and mouse or other pointing device, and information output and presentation devices, such as a monitor and printer.

As used herein, the term "lender" includes any person or entity fulfilling a role as a loan maker or loan purchaser, not necessarily an actual lending institution or officer thereof.

A lender uses the lender station 130 to search the database for particular desired types of loans, to sort selected loans by particular desired criteria, to bid on loan applications, and to be notified when their bids are accepted. The lender at the lender station 130 can construct and store its own particular desired criteria, and retrieve and reuse those stored criteria. The lender at the lender station 130 can also direct the transaction server 110 to actively search for its own particular desired criteria, and to notify the lender at the lender station 130 when any loans matching those criteria appear in the trading system database 111.

In a preferred embodiment, similar to the broker station 120, the lender station 130 makes connections to the transaction server 110 using the network 140 on an as-needed basis, so as to send messages to the transaction server 110 without excessive use of the network 140.

Similar to the broker station 120, the lender station 130 can also receive asynchronous communications from the transaction server 110, such as in the event there are urgent communications or other information of immediate interest to the lender. Also similar to the broker station 120, the lender station 130 can also receive electronic mail messages from other users of the system 100, including brokers, other lenders, or other parties.

Similar to the broker station 120, the lender broker station 130 includes a software interface to an existing desktop underwriting software element, so that lenders can use that existing desktop underwriting software element to review loan profiles and decide whether or not to bid on those loan profiles.

(4) Administration Station

The administration client 150 comprises a device or set of devices coupled to the network 140, such as a general purpose processor operating under control of operating system and application software, and disposed to process loan profiles, as described herein. In a preferred embodiment, the administration client 150 can comprise a PC workstation such as an Intel Pentium processor operating under control of the Microsoft Windows 95 operating system, or can comprise software operating on a processor used for the transaction server 110.

The administration client 150 operates under control of administration client software, which interacts using the network 140 with the transaction server 110 as described herein. The administration client 150 includes information input devices, such as a keyboard and mouse or other pointing device, and information output and presentation devices, such as a monitor and printer.

As used herein, the term "administrator" includes any person or entity fulfilling a role as an administrator of the system 100, not necessarily an official of any entity associated with administration or maintenance of the system 100.

An administrator uses the administration client 150 to monitor operation of the system 100, to generate reports on operation of the system 100, and to be notified of any alertable conditions of the system 100.

Information is collected by the administration client 150 and stored in the system 100 and used in support of trading, including the following:

personal and organizational information about the parties (both brokers and lenders), including—organizational affiliation, address and telephone number for contact, delivery information, electronic mail address information about changes in relationship between any parties, including when a loan processor or lender representative enters or leaves any selected broker or lender organization This information is transmitted to the transaction server 110 so as to ensure integrity of trading operations. For example, the transaction server 110 can enable or disable passwords at appropriate times, and can track any loans affiliated with the parties after their change in organizational affiliation.

modification of a selected loan profile at the request of a broker client 120

Information is available to the administrator at the administration client 150 information regarding performance of the system 100, including the following:

number of brokers using the system 100 number of lenders using the system 100 number of loan profiles processed over a specified period of time number of loan profiles stored in the trading system database 111

In a preferred embodiment, similar to the broker station 120, the administration client 150 makes connections to the transaction server 110 using the network 140 on an as-needed basis, so as to send messages to the transaction server 110 without excessive use of the network 140.

Similar to the broker station 120, the administration client 150 can also receive asynchronous communications from the transaction server 110, such as in the event there are urgent communications or other information of immediate interest to the administrator. Also similar to the broker station 120, the administration client 150 can also receive electronic mail messages from other users of the system 100, including brokers, lenders, or other parties.

(5) System Monitor Station

A set of system monitor stations 160 are coupled to the network 140 for remotely monitoring and controlling the state and usage of the transaction server 110. An operator using one or more of the system monitor stations 160 is capable of starting or stopping one of the program modules of the transaction server 110 or other components of the system 100. Each system monitor stations 160 provides visual display of the state and usage of the transaction server 110, selected ones of its program modules, and the network 140.

(6) Web Server

A web server 170 is coupled to the network 140 for maintaining and serving documents and other information used by brokers at the broker stations 120, lenders at the lender stations 130, and administrators at the administrator stations 150. In a preferred embodiment, the web server 170 includes the following information:

due diligence information on brokers and lenders, made available only to authorized persons for review;

loan documents deposited by brokers or lenders, to be forwarded or transmitted only to authorized persons;

rules, regulations, and procedures for trading using the system 100, made available to all authorized persons (7) Other System Elements The network 140 provides for communication between the transaction server 110, the broker station 120, the lender station 130, and the administration station 150, using messages as described herein and message protocols appropriate to transmission and reception of those messages. The network 140 includes a WAN (wide area network) such as the "Advantis" network available from IBM Corporation of Armonk, N.Y. However, in alternative embodiments, the network 140 may use internet, intranet, dial-up telephone lines or leased communication lines, or some combination thereof. In a preferred embodiment, the network 140 uses duplicate communication lines between nodes, and provides for automated failover transparent to users.

In a preferred embodiment, messages transmitted using the network are encrypted or use digital signatures or other security measures to verify their source and to assure that they are not tapped or forged by intruders.

System Operation

Figure 2:
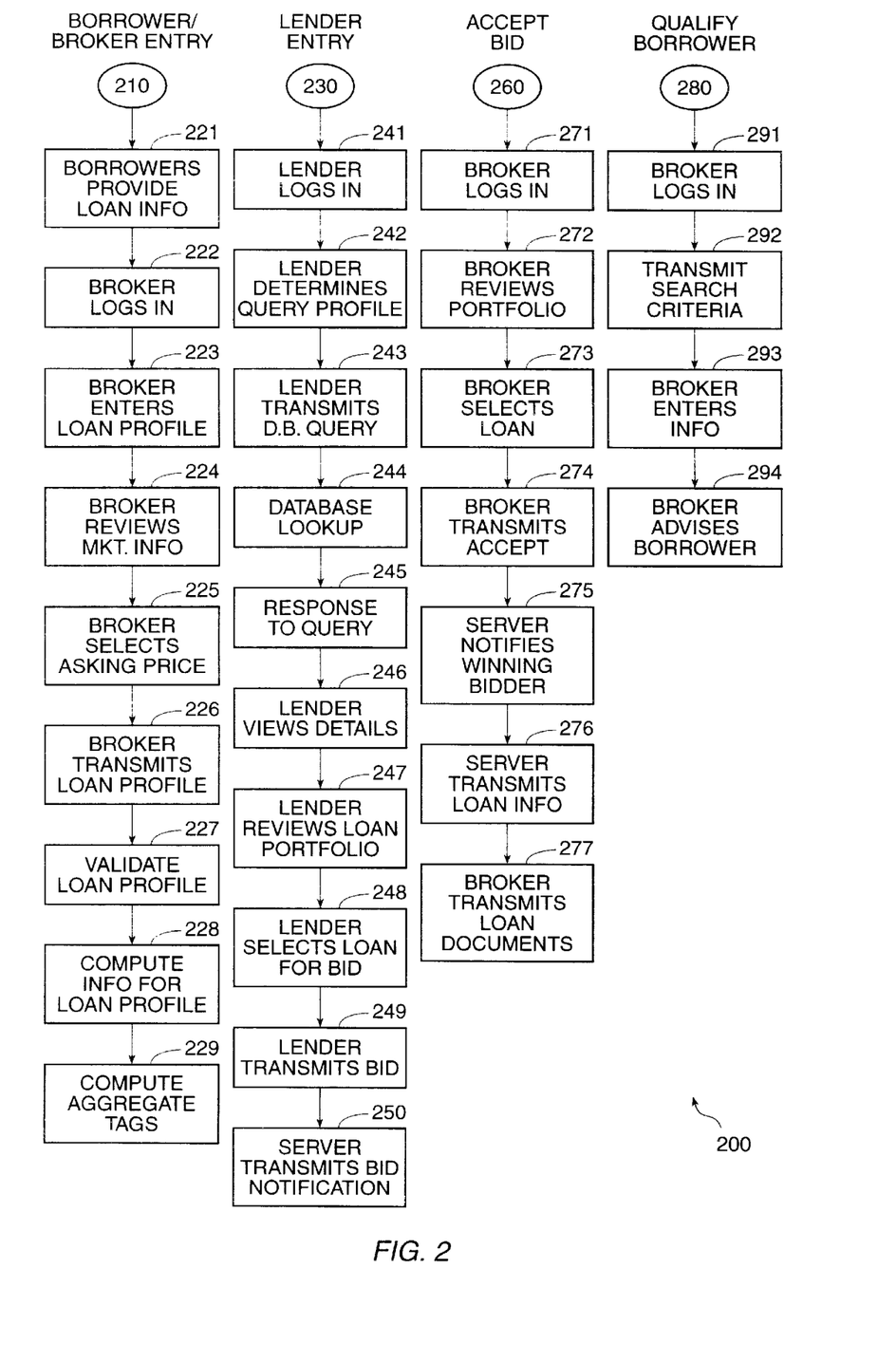
FIG. 2 shows a process flow diagram of operation of an interactive mortgage and loan information and real-time trading system.

FIG. 2 shows a process flow diagram of operation of an interactive mortgage and loan information and real-time trading system.

A method 200 of operation of the system 100 includes a plurality of flow points and process steps as described herein.

At a flow point 210, a prospective borrower desires to obtain a home mortgage loan or similar loan.

At a step 221, the borrower transmits prospective loan information regarding a prospective loan application to a mortgage broker, loan broker, or similar agent. In a preferred embodiment, the prospective loan information can be transmitted using an industry standard form for prospective loan information, such as a Form 1003 or Form 1008. The prospective loan information can also be transmitted using a computer file prepared using an existing loan documentation or origination software package.

At a step 222, the broker at the broker station 120 logs in to the transaction server 110 and verifies that the broker station 120 is authorized to access the system 100. In this step, the transaction server 110 transmits any access control data or other data needed to initialize the broker station 120 so as to customize it for access by that individual broker, loan processor, or broker manager.

The broker can perform one of a set of functions using the broker station 120, including the following:

managing loan profiles, including—creating a loan profile and adding it to the trading system database 111; reviewing a loan profile already in the trading system database 111; altering or otherwise updating a loan profile already in the trading system database 111 managing loan portfolios, including—searching pending loan profiles for those with or without bids, or for those with accepted bids managing bids on loans, including—viewing bids on loan profiles, accepting bids, viewing accepted bids viewing market information, including—viewing real time market data, viewing other mortgage news feeds or other news feeds prequalifying borrowers, including viewing interest rates available on the system 100, such as the average interest rate, high interest rate, low interest rate, or median interest rate associated with selected loan profile information; viewing aggregate interest rates for the entire system 100; viewing lender activity in terms of number of lenders who have purchased selected types of loans managing lender selection, including—deselecting particular lenders so that those lenders do not see loan profiles from this broker station 120; reselecting particular lenders communicating with other users of the system 100, including—electronic mail messages; paging password management, including—password changes In a preferred embodiment, the system 100 allows hierarchical management of loans from the perspective of the loan originator. A loan processor is allowed to perform these functions on behalf of one or more selected brokers, but is not allowed to post a loan on the loan processor's own behalf. Brokers can delegate authority to loan processors to post loans, and can exclude or include authority to accept bids with that delegation of authority. A selected broker manager is allowed to perform these functions as well as to post loans on the manager's own behalf. Authorization as a broker, loan processor, or manager is performed in the step 222 during login.

At a step 223, the broker at the broker station 120 interactively enters data for the loan profile, optionally periodically or intermittently save that data, optionally edits that data, optionally validates that data for reasonable values at the broker station 120, and when complete, prepares to transmit the completed loan profile to the transaction server 110.

At a step 224, the broker at the broker station 120 optionally reviews financial market information and mortgage market information relevant to the loan profile. This allows the broker to set competitive asking prices for loan profiles.

At a step 225, the broker at the broker station 120 sets a selected asking price for the loan profile.

At a step 226, the broker station 120 transmits a loan profile to the transaction server 110. The loan profile includes the prospective loan information, but the transaction server 110 does not identify the borrower or the broker to prospective lenders.

At a step 227, the transaction server 110 validates the information provided for each loan profile, such as determining whether there is in fact a property at the indicated property location and whether there is in fact a property of the indicated property type at the indicated property location. If the transaction server 110 deter mines that the information provided for the loan profile is not valid (to more than a trivial extent), the transaction server 110 responds to the broker station 120 by requesting correction.

As part of the step 227, the transaction server 110 or the broker station 120 can transform certain data entry values so as to make it convenient for the broker to enter data. For example, for loan amount, the transaction server 110 or the broker station 120 can accept the value "300K" and transform that to the value "300,000".

Also as part of the step 227, the transaction server 110 provides for detecting substantially identical loan profiles originated by the same broker station 120, so as to prevent multiple applications for the same borrower for the same property; this practice is sometimes known as "double apping".

At a step 228, the transaction server 110 computes any computed information for the loan profile (including determining whether the loan profile is CRA eligible) and stores the loan profile in the trading system database 111.

At a step 229, the transaction server 110 computes aggregate tags for the loan profile so as to respond to specialized lender queries, such as whether the loan profile is for a "prime" loan or a "subprime" loan or whether the loan profile is CRA eligible), and stores that information in the loan profile in the trading system database 111.

At a flow point 230, a prospective lender desires to bid on one or more loan applications.

At a step 241, the lender at the lender station 130 logs in to the transaction server 110 and verifies that the lender station 130 is authorized to access the system 100.

In a preferred embodiment, selected lenders are allowed to access selected categories of loan profiles depending on the nature of their membership or privileges granted to them when signing up for using the system 100. For example, selected portions of the lender's ability to query the trading system database 111 can depend on the level of service the lender requested when signing up for the system 100. As part of the step 241, this information is transmitted by the transaction server 110 to the lender station 130 upon verification of the lender station 130.

The lender can perform one of a set of functions using the lender station 130, including the following:

managing loan profile searches, including—defining loan profile searches, storing loan profile searches for later use or reuse, directing the transaction server 110 to perform a loan profile search
Loan profile searches can specify that the loan profile can be considered for community investment purposes or is CRA qualified.
Loan profile searches can also be specified to be "active," in which the transaction server 110 is directed to periodically perform the loan profile search on updated contents of the trading system database 111, and to notify the lender station 130 of revised results of the active loan profile search.
managing search results, including—viewing results of a loan profile search
managing bids on loans, including—placing bids on loan profiles, receiving notification of accepted bids
The transaction server 110 provides limited information to this particular lender station 130 on bids placed by other lender stations 130. In the case that this particular lender station 130 had the winning bid, the next best bid is provided for display; in the case that this particular lender station 130 had its bid rejected, the winning bid is provided for display.
managing loan portfolios, including—searching loan profiles for accepted bids;
searching loan profiles for selected status of loan processing; viewing particular loan profiles for bid or processing status
viewing market information, including—viewing real time market data, viewing other mortgage news feeds or other news feeds
managing broker selection, including—deselecting particular brokers so that loan profiles from those brokers are not found by loan profile searches from this lender station 130; reselecting particular brokers; viewing due diligence information on particular brokers
communicating with other users of the system 100, including—electronic mail messages; paging
password management, including—password changes At a step 242, the lender at the lender station 130 determines a query profile for querying the database, depending on the loan programs available to the lender at that time. In a preferred embodiment, the lender station 130 optionally stores the query profiles, so that the lender can optionally use or modify a query profile for reuse.

At a step 243, the lender at the lender station 130 transmits a database query to the transaction server, requesting loan profiles regarding prospective loans which might be of interest to the lender. As part of the query, the lender can choose to retrieve only those loans on which the lender has not already bid, or to retrieve all such loans regardless of their bid status.

Although the lender is not informed of the identity of the borrower, the lender can query for searchable database elements relating to the borrower. For example, the lender can search on criteria such as the following:

loan category (FHLMC, FNMA, Conduit, VA, FHA, Other); loan type (adjustable or fixed interest rate); amortization time; loan purpose (new purchase, improvement); occupancy status calculated credit information for the loan, such as a LTV (loan to value) ratio, a qualifying credit score, front and back ratios, loan lock period, a total loan amount, whether the loan is "conforming"

particular qualifying credit information regarding the borrower, such as gross family income, other outstanding debts, or credit history reports particular credit information regarding the property, such as its nature (raw land, condominium, detached single family home, apartment less than four units, income property), its location (census tract, zip code, city, county, state), and whether it qualifies for CRA (Community Reinvestment Act) credit for the lender particular credit information regarding the broker, such as a history of loan qualification or loan performance for loans originating with that broker At a step 244, the transaction server 110 performs a database lookup for the trading system database 111 in response to the database query, and transmits a query response to the lender station 130. The query response identifies loan profiles which match the database query.

At a step 245, the transaction server 110 transmits information regarding loan profiles matching the query to the lender station 130. In a preferred embodiment, loans already bid upon by the lender are so marked, such as by being displayed in a different color.

At a step 246, the lender at the lender station 130 can view details of the loan profile interactively. In a preferred embodiment, the lender's attention is drawn by marking selected loan profiles, such as by being displayed in a different color. Selected loan profiles can include those having comments regarding the nature of the property or qualifying qualitative remarks.

At a step 247, the lender at the lender station 130 optionally reviews the lender's portfolio of those loans with accepted or rejected bids and those loans waiting for responses from brokers at broker stations 120. The lender at the lender station 130 optionally reviews the lender's bids declined by brokers at broker stations 120 against winning bids, and optionally reviews the lender's winning bids against others' bids declined by brokers at broker stations 120. The lender at the lender station 130 optionally reviews market performance, including activity in the system 100.

At a step 248, the lender at the lender station 130 selects a loan profile for bid and optionally requests details of that selected loan profile; in response, the transaction server 110 transmits details about the loan profiles to the lender station 130.

At a step 249, the lender at the lender station 130 transmits a bid on one of the loan profiles. The transaction server 110 enters the bid in the loan profile, indicating that the lender has bid on the loan profile, but does not identify the lender to prospective borrowers or brokers.

The bid can have an associated expiration time, after which the transaction server 110 will mark the bid withdrawn (or delete it), so that it can no longer be accepted.

In a preferred embodiment, the lender at the lender station 130 can post a single common bid for multiple loan profiles.

At a step 250, the transaction server 110 transmits a bid notification to each broker station 120 associated with a loan profile which has received a bid. The bid notification can include one or more of the following: (a) a bid alert on a display at the broker station 120, (b) a pager notification to the broker; (c) an electronic mail message to the broker station 120.

At a flow point 260, a prospective borrower desires to accept a bid on a loan application.

At a step 271, the broker at the broker station 120 logs in to the transaction server 110 and verifies that the broker station 120 is authorized to access the system 100 and is authorized to accept bids for that broker.

At a step 272, the broker at the broker station 120 optionally reviews the broker's portfolio of those loans with accepted bids, those loans with pending unaccepted bids, and those loans waiting for bids from lenders at lender stations 130. The broker at the lender station 130 optionally reviews market performance, including activity in the system 100.

At a step 273, the broker at the broker station 120 selects a loan profile with pending unaccepted bids and optionally requests details of that selected loan profile; in response, the transaction server 110 transmits details about the loan profiles to the broker station 120. The broker at the broker station 120 selects one or more pending bids for that loan profile and optionally requests details about those bids; in response, the transaction server 110 transmits details about the pending bids to the broker station 120.

At a step 274, the broker station 120 transmits an acceptance, for a particular bid for a particular loan profile, to the transaction server 110. The transaction server 110 marks that bid at the loan profile as having been accepted, and marks all other bids at the loan profile as having been rejected.

At a step 275, the transaction server 110 notifies the winning bidder lender of the bid acceptance.

At a step 276, the transaction server 110 transmits complete prospective loan information to the lender at the lender station 130 and complete lender information to the broker at the broker station 120, thus informing the borrower of the identity of the lender and informing the lender of the identity of the borrower.

Although the lender at the lender station 130 is not informed of the identity of the broker associated with the loan profile until the bid is accepted, the lender at the lender station 130 can select broker stations 120 for identification as being undesirable, so that loan profiles from those broker stations 120 are not transmitted in the query response. Similarly, although the broker at the broker station 120 is not informed of the identity of the lender associated with the bid, the broker at the broker station 120 can select lender stations 130 for identification as being undesirable, so that bids from those lender stations 130 are not displayed in the loan profile (and the broker station 120 is not notified of receipt of bids from those lender stations 130).

At a step 277, the broker transmits, either on paper or by EDI (electronic data interchange), a complete loan application package in a format acceptable to the particular lender. After verification of the prospective loan information or other formalities, the lender completes the loan.

The broker at the broker station 120 can also prequalify prospective borrowers or a prospective loan profile so as to determine feasibility for a particular loan or a particular loan amount.

At a flow point 280, a broker desires to prequalify a prospective borrower.

At a step 291, the broker at the broker station 120 logs in to the transaction server 110 and verifies that the broker station 120 is authorized to access the system 100.

At a step 292, the transaction server 110 transmits to the broker station 120, and the broker station 120 initializes, search criteria for prequalification with a set of loan products available from lenders at lender stations 130 or otherwise tradeable on the system 100.

At a step 293, the broker at the broker station 120 enters preliminary information regarding the prospective borrower, such as—expected credit score, and expected front ratio, back ratio, and LTV ratio. The broker at the broker station 120 can enter information regarding points or rates, and obtain current and past corresponding points or rates; for example, the broker at the broker station 120 can enter a selected interest rate and obtain the average, high, and low values for points corresponding to that interest rate for completed loan transactions on the system 100. The broker at the broker station 120 can also determine statistics regarding how many lenders have made loans of those types.

At a step 294, the broker at the broker station 120 can inform the prospective borrower about whether or not it is feasible to obtain competitive rates in those contemplated ranges.

The transaction server 110 records information regarding pending loan profiles and completed loans for later monitoring and reporting by the administrative client 150. In a preferred embodiment, this information includes at least the following:

an audit trail of all actions taken with regard to each particular loan profile, including all transaction data associated with the loan profile for future verification a record of loan performance for loan profiles which have been processed using the system 100, including a database of loan performance searchable by various criteria In a preferred embodiment, the borrower and the lender are each charged a fee for the service provided by the transaction server. The fee is paid out of escrow funds by a selected escrow company when the loan and an associated purchase of the property are completed. The amount of the fee can be fixed or can be varied in response to the prospective loan information, such as the amount of the loan, and in a preferred embodiment is varied in response to CRA qualification for the loan.

Alternative Embodiments

Although preferred embodiments are disclosed herein, many variations are possible which remain within the concept, scope, and spirit of the invention, and these variations would become clear to those skilled in the art after perusal of this application.

We claim:

1. A method for processing loan applications, said method including the steps of maintaining a database of pending loan applications and their statuses at a database server, wherein each party to a loan can search and modify that database consistent with their role in the transaction by requests to said server from a client device identified with their role.

2. A method as in claim 1, wherein said loan applications comprise home mortgage loan applications.

3. A method as in claim 1, wherein said database can be modified by entering bids on a loan application from one of a plurality of potential lenders.

4. A method as in claim 1, wherein said roles include a loan originator and said client device includes a broker station associated with at least one said loan originator; and said loan originator can review the status of loan applications entered by that loan originator, and can accept bids by lenders.

5. A method as in claim 4, wherein said loan originator is a broker, loan processor, manager, or prospective borrower.

6. A method as in claim 4, wherein said loan originator is notified of lender's bids on its loans.

7. A method as in claim 1, wherein said roles include a lender and said client device includes a lender station associated with at least one said lender; and said lender can search the database for particular desired types of loans, and can bid on loan applications.

8. A method as in claim 7, wherein said lender is notified when its bid is accepted.

9. A method as in claim 1, wherein said database includes tags for loans using identifiers which might be of interest to lenders.

10. A method as in claim 9, wherein said identifiers include a property location, borrower credit information, or CRA qualification for the property.

11. A method as in claim 1, wherein said database includes computed values which might be of interest to lenders.

12. A method as in claim 11, wherein said computed values include a credit score.

13. A method as in claim 1, wherein said database server provides for detecting substantially identical loan applications originated by the same broker, so as to prevent double applications for the same borrower for the same property.

14. A method as in claim 1, wherein said database server provides parties the capability for designating counterparties with whom they wish not to conduct business.

15. A method as in claim 1, including the step of allowing lenders to bid on pending loan applications without revealing their rates or pricing strategies.

16. A method as in claim 1, including the step of authorizing each loan originator in one or more of a plurality of authorization classes.

17. A method as in claim 16, wherein said authorization classes form a hierarchy.

18. A method as in claim 1, including the step of prequalifying prospective borrowers using statistical information about loan applications.

19. A system for processing loan applications, said system including a database of pending loan applications, said database including status information regarding said pending loan applications;

a transaction server, said transaction server being responsive in real time to requests from parties to said pending loan applications, said requests including requests for searching and requests for modifying said database consistent with roles for said parties.

20. A system as in claim 19, including a client device associated with each said party.

21. A system as in claim 19, wherein said pending loan applications comprise home mortgage loan applications.

22. A system as in claim 19, wherein said database includes a set of bids associated with each said loan application; and said transaction server responds to a new bid from one of a plurality of potential lenders by entering said new bid with an associated loan application.

23. A system as in claim 19, including a broker station associated with at least one loan originator, wherein said broker station is capable of reviewing the status of loan applications entered by that loan originator, and is capable of accepting bids by lenders for said loan applications entered by that loan originator.

24. A system as in claim 23, wherein said loan originator is a broker, loan processor, manager, or prospective borrower.

25. A system as in claim 23, including a message notifying said loan originator of said bids by lenders.

26. A system as in claim 19, including a lender station associated with at least one said lender; wherein said lender station is capable of requesting said transaction server to search said database for particular desired types of loans, and is capable of submitting bids on loan applications to said transaction server.

27. A system as in claim 26, including a message notifying said lender when its bid is accepted.

28. A system as in claim 19, wherein said database includes tags for loans using identifiers which might be of interest to lenders.

29. A system as in claim 28, wherein said identifiers include a property location, borrower credit information, or CRA qualification for the property.

30. A system as in claim 19, wherein said database includes computed values which might be of interest to lenders.

31. A system as in claim 30, wherein said computed values include a credit score.

32. A system as in claim 19, wherein said transaction server is capable of detecting substantially identical loan applications originated by the same broker, whereby double applications for the same borrower for the same property are substantially prevented.

33. A system as in claim 19, wherein said transaction server responds to requests by brokers designating selected lenders with whom they wish not to conduct business.

34. A system as in claim 19, wherein said transaction server responds to requests by lenders designating selected brokers with whom they wish not to conduct business.

35. A system as in claim 19, wherein said transaction server responds to bids from lenders without revealing their rates or pricing strategies.

36. A system as in claim 19, wherein said transaction server includes means for authorizing each loan originator in one or more of a plurality of authorization classes.

37. A system as in claim 36, wherein said authorization classes form a hierarchy.

38. A system as in claim 19, including means for prequalifying prospective borrowers using statistical information about loan applications.

* * * * *

US005995947C1

(12) EX PARTE REEXAMINATION CERTIFICATE (10317th)
United States Patent
Fraser et al.

(10) Number: US 5,995,947 C1
(45) Certificate Issued: Oct. 9, 2014

(54) INTERACTIVE MORTGAGE AND LOAN INFORMATION AND REAL-TIME TRADING SYSTEM

(75) Inventors: Stephen K. Fraser, Livermore, CA (US); Sadashiv Adiga, Hercules, CA (US); Suresh Payankannur, Richmond, CA (US)

(73) Assignee: IMX, Inc.

Reexamination Request:
No. 90/009,857, Dec. 2, 2010

Reexamination Certificate for:
Patent No.: 5,995,947
Issued: Nov. 30, 1999
Appl. No.: 08/928,559
Filed: Sep. 12, 1997

(51) Int. Cl.
*G06F 17/00* (2006.01)

(52) U.S. Cl.
USPC .................................. 705/38; 705/35; 705/37

(58) Field of Classification Search
None
See application file for complete search history.

(56) References Cited

To view the complete listing of prior art documents cited during the proceeding for Reexamination Control Number 90/009,857, please refer to the USPTO's public Patent Application Information Retrieval (PAIR) system under the Display References tab.

*Primary Examiner* — Jeffrey Carlson (57) ABSTRACT

The invention provides a method and system for trading loans in real time by making loan applications, such as home mortgage loan applications, and placing them up for bid by a plurality of potential lenders. A transaction server maintains a database of pending loan applications and their statuses; each party to the loan can search and modify that database consistent with their role in the transaction, by requests to the server from a client device identified with their role. Brokers at a broker station can add loan applications, can review the status of loan applications entered by that broker, are notified of lender's bids on their loans, and can accept bids by lenders. Lenders at a lender station can search the database for particular desired types of loans, can sort selected loans by particular desired criteria, can bid on loan applications, and are notified when their bids are accepted. Broker stations, lender stations, and the transaction server can be coupled using multiple access methods, including internet, intranet, or dial-up or leased communication lines.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 7-8 and 26-27 is confirmed.

Claims 1-2, 9-12, 19-21 and 28-31 are cancelled.

Claims 3-6, 13-18, 22-25 and 32-38 were not reexamined.

* * * * *